United States Patent
Son

(10) Patent No.: US 9,557,959 B2
(45) Date of Patent: *Jan. 31, 2017

(54) ANALOG/DIGITAL AUDIO CONVERTER AND A METHOD THEREOF

(71) Applicant: SAMSUNG ELECTRONICS CO., LTD., Suwon-si, Gyeonggi-do (KR)

(72) Inventor: Tae-yong Son, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 38 days.

This patent is subject to a terminal disclaimer.

(21) Appl. No.: 14/590,336

(22) Filed: Jan. 6, 2015

(65) Prior Publication Data

US 2015/0120028 A1 Apr. 30, 2015

Related U.S. Application Data

(63) Continuation of application No. 11/116,287, filed on Apr. 28, 2005, now Pat. No. 8,954,171.

(30) Foreign Application Priority Data

Nov. 9, 2004 (KR) .................. 10-2004-0090653

(51) Int. Cl.
G06F 17/00 (2006.01)
G06F 3/16 (2006.01)
(Continued)

(52) U.S. Cl.
CPC .............. G06F 3/165 (2013.01); H04N 5/46 (2013.01); H04N 5/602 (2013.01); H04N 21/42638 (2013.01); H04N 21/4398 (2013.01)

(58) Field of Classification Search
CPC ............... H04N 21/43615; H04N 21/42638; G10L 19/167; G10L 19/173; H04R 3/12; H04R 2227/005; H04S 2400/15
See application file for complete search history.

(56) References Cited

U.S. PATENT DOCUMENTS 6,192,427 B1    2/2001  Li et al.
6,263,503 B1 *  7/2001  Margulis ..................... 725/81
(Continued)

FOREIGN PATENT DOCUMENTS

JP    11-164240    6/1999
JP    11-225292    8/1999
(Continued)

OTHER PUBLICATIONS

Harman Kardon, Inc., "AVR 630 Audio/Video Receiver Owner's Manual", copywrite 2003, Harman Kardon Inc., pp. 1-54.
(Continued)

*Primary Examiner* — Davetta W Goins
*Assistant Examiner* — Daniel Sellers
(74) *Attorney, Agent, or Firm* — Staas & Halsey LLP

(57) ABSTRACT

An analog/digital audio converting apparatus enables listening to both digital and analog audio signals received from a digital receiving apparatus and analog audio signals input from an external source using the same receiver by providing a formatter capable of converting the analog audio signal into a digital audio signal with the digital broadcasting receiving apparatus.

18 Claims, 2 Drawing Sheets

(51) Int. Cl.
*H04N 5/46* (2006.01)
*H04N 5/60* (2006.01)
*H04N 21/426* (2011.01)
*H04N 21/439* (2011.01)

(56) References Cited

U.S. PATENT DOCUMENTS

| | | | |
|---|---|---|---|
| 6,490,001 | B1 | 12/2002 | Shintani et al. |
| 6,741,293 | B1 | 5/2004 | Obuchi |
| 6,772,354 | B2 | 8/2004 | Takenaka et al. |
| 7,233,781 | B2 | 6/2007 | Hunter et al. |
| 7,260,308 | B2 | 8/2007 | Engle et al. |
| 7,436,457 | B2 | 10/2008 | Lee et al. |
| 7,502,073 | B2 * | 3/2009 | Umesako ............ 348/555 |
| 7,646,968 | B1 * | 1/2010 | Wang ............ H04N 5/85 386/239 |
| 2001/0009548 | A1 | 7/2001 | Morris |
| 2002/0057893 | A1 | 5/2002 | Wood et al. |
| 2002/0095689 | A1 | 7/2002 | Novak |
| 2003/0056221 | A1 | 3/2003 | Zhang et al. |
| 2004/0119893 | A1 | 6/2004 | Burnworth |
| 2004/0244033 | A1 | 12/2004 | Ostensoe et al. |
| 2005/0063418 | A1 | 3/2005 | Case |
| 2005/0166252 | A1 | 7/2005 | Hallberg |
| 2008/0072272 | A1 | 3/2008 | Robertson et al. |

FOREIGN PATENT DOCUMENTS

| | | |
|---|---|---|
| JP | 2001-256694 | 9/2001 |
| JP | 2002-112145 | 4/2002 |
| JP | 2003-152574 | 5/2003 |
| JP | 2003-304461 | 10/2003 |
| KR | 20-262157 | 3/2002 |

OTHER PUBLICATIONS

Korean Office Action dated Jul. 28, 2006 in KR 2004-90653.
U.S. Notice of Allowance mailed Oct. 1, 2014 in related U.S. Appl. No. 11/116,287.
U.S. Office Action issued Dec. 3, 2013 in related U.S. Appl. No. 11/116,287.
U.S. Office Action issued Apr. 22, 2013 in related U.S. Appl. No. 11/116,287.
U.S. Advisory Action issued Aug. 25, 2011 in related U.S. Appl. No. 11/116,287.
U.S. Office Action issued Apr. 25, 2011 in related U.S. Appl. No. 11/116,287.
U.S. Office Action issued Nov. 9, 2010 in related U.S. Appl. No. 11/116,287.
U.S. Office Action issued Aug. 18, 2010 in related U.S. Appl. No. 11/116,287.
U.S. Office Action issued Mar. 16, 2010 in related U.S. Appl. No. 11/116,287.
U.S. Office Action issued Sep. 22, 2009 in related U.S. Appl. No. 11/116,287.
U.S. Advisory Action issued Aug. 7, 2009 in related U.S. Appl. No. 11/116,287.
U.S. Office Action issued May 26, 2009 in related U.S. Appl. No. 11/116,287.
U.S. Office Action issued Nov. 25, 2008 in related U.S. Appl. No. 11/116,287.
U.S. Appl. No. 11/116,287, filed Apr. 28, 2005, Tae-Yong Son, Samsung Electronics Co., Ltd.

* cited by examiner

ANALOG/DIGITAL AUDIO CONVERTER AND A METHOD THEREOF

CROSS-REFERENCE TO RELATED APPLICATIONS

This application is a continuation of U.S. application Ser. No. 11/116,287 filed Apr. 28, 2005, which claims the benefit under 35 U.S.C. §119 of Korean Patent Application No. 10-2004-0090653, filed Nov. 9, 2004, in the Korean Intellectual Property Office, the disclosure of which is incorporated herein in its entirety by reference.

BACKGROUND OF THE INVENTION

1. Field of the Invention

The present general inventive concept relates to an analog/digital audio output apparatus. More particularly, the present general inventive concept relates to an audio output apparatus to enable reception of an analog audio signal in a digital broadcasting receiving apparatus through an external receiver.

2. Description of the Related Art

Audio signals received and processed in a digital broadcasting receiving apparatus comprise AC-3 and moving picture experts group (MPEG) data, which are decoded using a software codec capable of compressing and playing a digital audio signal processed by a digital signal processor (hereinafter, referred to as "digital audio DSP"), or without a dedicated hardware, and analog-processed to be output through a speaker. If being provided with a dedicated external audio/video (AV) receiver, a user can output the AC-3 and the MPEG data received through the digital broadcasting receiving apparatus as a digital signal without causing any loss of the data, connect the digital broadcasting receiving apparatus to the external A/V receiver, decode the digital signal at the digital audio DSP in the external A/V receiver and output the decoded signal through a speaker. Among digital audio interfaces for the above operations, a SONY®/PHILIPS® digital interface (SPDIF) is a prevailing one for domestic use.

The SPDIF has a digital output standard produced by SONY® corporation and ROYAL PHILIPS® Electronics, and FIG. 1 schematically shows a block diagram of a conventional digital broadcasting receiving apparatus for processing a digital output of the SPDIF. Referring to FIG. 1, the conventional digital broadcasting receiving apparatus mainly comprises a digital processing part and an analog processing part.

The digital processing part comprises a tuner 10 for receiving a channel from an external sky wave, a cable, and a satellite, a channel demodulator (demod) 20 for outputting a transport stream (TS) corresponding to the received channel, a multimedia processor 50 including a TS demultiplexer (demux), an MPEG decoder and a graphic mixer, a controller (CPU) 40 for controlling the overall system, and a digital audio DSP 60 for processing the digital audio. The multimedia processor 50 outputs an image as a video out signal, a super video (S-video) out signal, or a digital video interactive (DVI) signal.

The digital audio DSP 60 outputs the SPDIF output (digital out) to the outside or transmits a digital audio signal to a national television system committee (NTSC) audio decoder 70 so as to enable a user to listen to the digital audio signal through an external speaker.

In general, the conventional digital broadcasting receiving apparatus is able to receive and process conventional analog broadcasting. Here, an audio signal in such a conventional analog broadcasting is in accordance with the NTSC.

The analog processing part comprises an NTSC intermediate frequency (IF) converter or decoder 30 for converting the channel received by the tuner 10 into an IF signal and the NTSC audio decoder 70 for processing the NTSC audio signal, that is, the IF signal. Also, even an externally input audio signal is input to the NTSC audio decoder 70 so as to be processed to the left or the right according to a user's choice and transmitted as a L/R out signal to the external speaker. The NTSC IF converter 30 outputs an NTSC video signal to the multi-media processor.

In the conventional digital broadcasting receiving apparatus as described above, the NTSC audio signal is volume-controlled by the NTSC audio decoder 70, output to the left or the right and input to the speaker or other external devices, such as a video cassette recorder (VCR) for recording.

The user utilizing the external receiver (not shown) connects the SPDIF output from the digital audio DSP 60 of the digital broadcasting receiving apparatus to an input terminal of the external receiver and decodes the SPDIF in a digital audio DSP of the external receiver to thereby listen to the sound through the external speaker. Usually, volume of the conventional digital broadcasting receiving apparatus is set to '0' because the volume of the digital broadcasting receiving apparatus is turned down when receiving through the external receiver.

In a case of converting the channel to the NTSC signal or receiving the external input audio signal, such as from the VCR, the audio signal at this time is in the analog form, and therefore, the user needs to turn up the volume of the conventional digital broadcasting receiving apparatus to listen to the sound.

In other words, when the digital broadcasting receiving apparatus is receiving NTSC broadcasting or processing an input from the external VCR, the user who uses a separate receiver having the digital audio DSP suffers an inconvenience of turning up the volume of the conventional digital broadcasting receiving apparatus which is primarily set to '0', in order to listen to the sound through the external speaker.

SUMMARY OF THE INVENTION

The present general inventive concept provides an apparatus capable of converting an analog audio signal to a digital audio signal and outputting the digital audio signal through a SONY®/PHILIPS® digital interface (SPDIF), such that a user who utilizes a dedicated receiver having a digital audio digital signal processor (DSP) therein is able to listen to the analog audio signal through an external speaker.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an analog/digital audio converting apparatus usable with a digital broadcasting receiving apparatus, the analog/digital audio converting apparatus comprising an audio decoder to select and output at least one of input analog audio signals, an output device to separate a digital audio signal from input signals of the digital broadcasting receiving apparatus and to output the separated signal as a first digital audio signal, a formatter to process the analog audio signal output from the audio decoder and to output the processed signal as a second digital audio signal, and a digital audio processing device to select and output one of the first digital audio signal output from the output device and the second digital audio signal output from the formatter.

The digital audio processing device may select and output one of the first and the second digital audio signals according to a selecting signal input externally. Alternatively, the digital audio processing device may select the second digital audio signal output from the formatter upon receiving a signal to select the signal output from the audio decoder.

At least one of the analog audio signals input to the audio decoder may be an analog audio signal output from the digital broadcasting receiving apparatus or an analog audio signal input from an external device. The first and the second digital audio signals may be SONY®/PHILIPS® digital interface (SPDIF) signals.

The formatter may be disposed within the digital audio processor, such that the analog audio signal output from the audio decoder is processed into the second digital audio signal, and one of the first and the second digital audio signals is selectively output.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
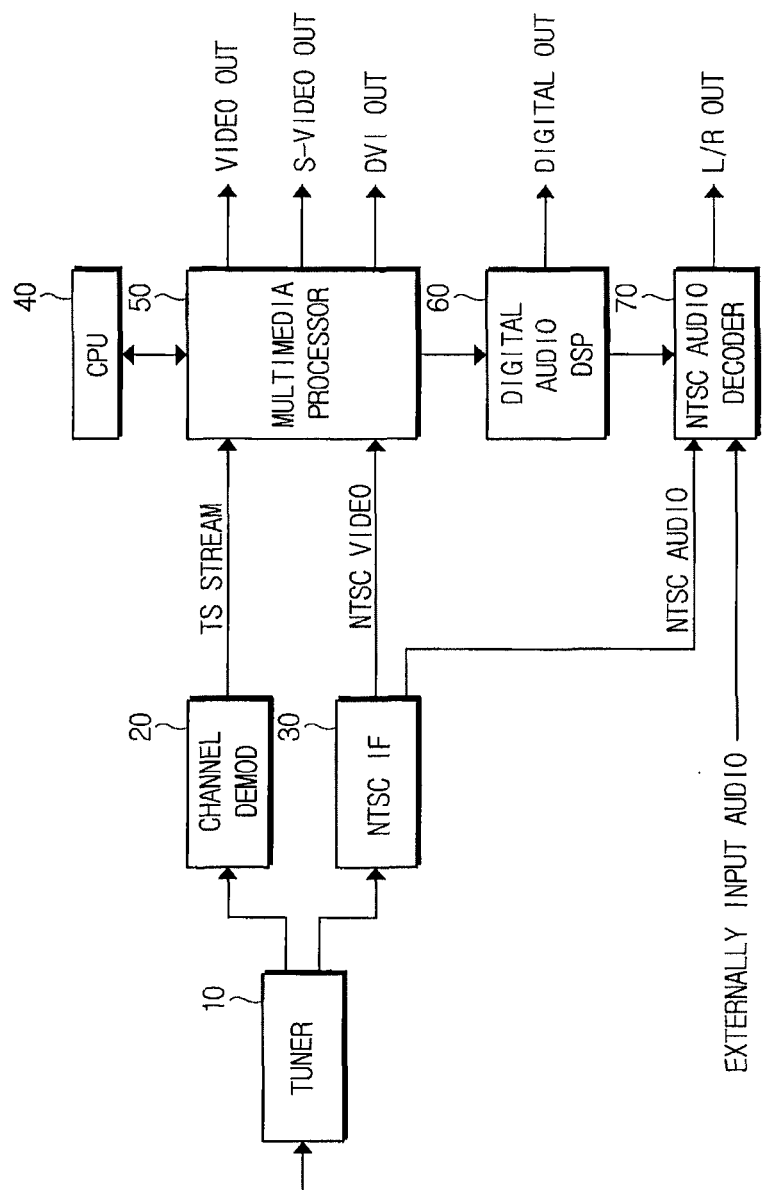
FIG. 1 is a block diagram of a conventional digital broadcasting receiving apparatus for processing a SONY®/PHILIPS® digital interface.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
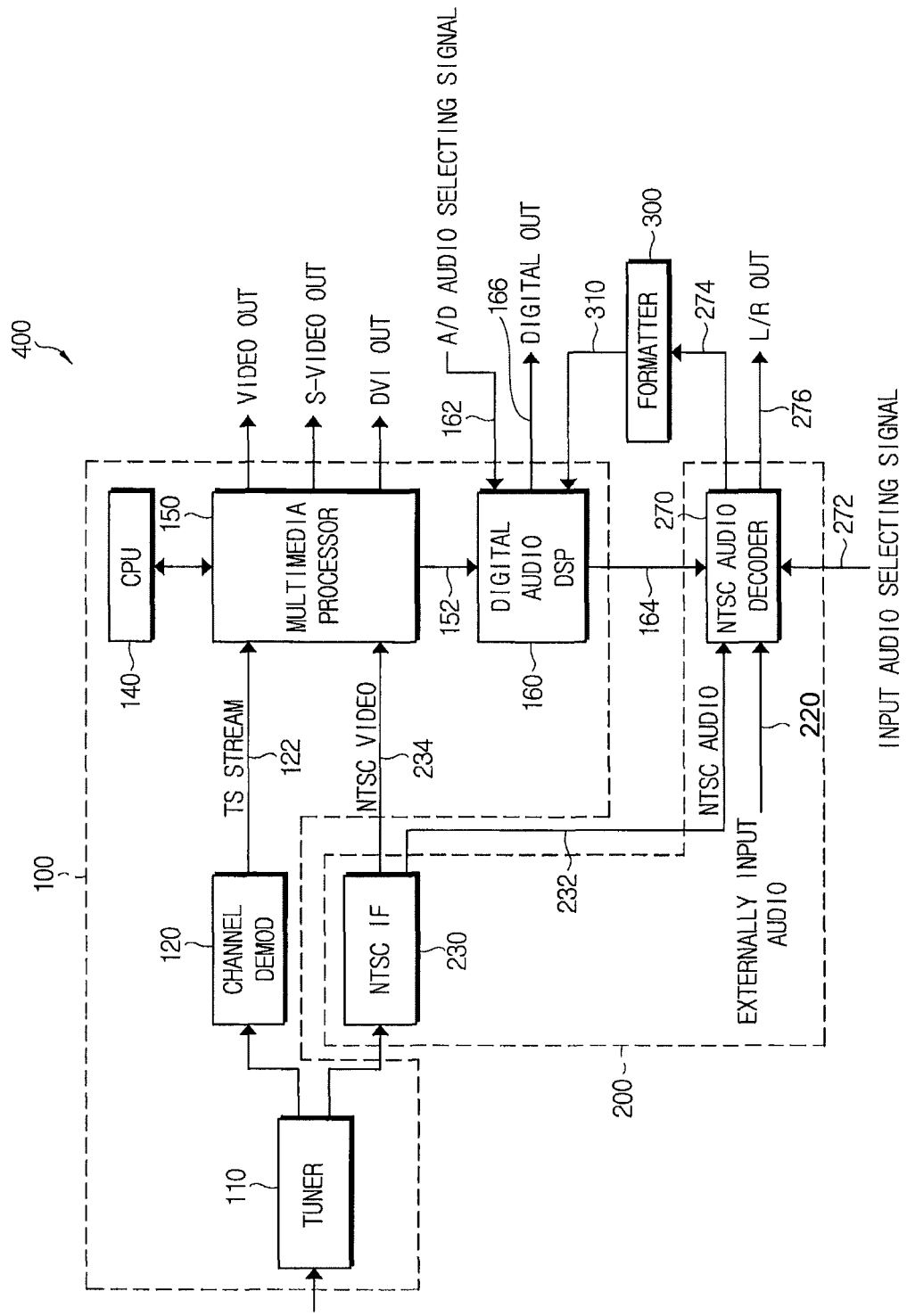
FIG. 2 is a block diagram illustrating a digital broadcasting receiving apparatus according to an embodiment of the present general inventive concept.

FIG. 2 is a block diagram illustrating a digital broadcasting receiving apparatus 400 according to an embodiment of the present general inventive concept.

Referring to FIG. 2, the digital broadcasting receiving apparatus 400 comprises a digital processing part 100, an analog processing part 200, and a formatter 300 to convert an audio signal output from the analog processing part 200 into a digital signal and to input the converted signal into the digital processing part 100.

The digital processing part 100 comprises a tuner 110 to receive a predetermined channel from an external sky wave, a cable, and a satellite, a channel demodulator (demod) 120 to process an intermediate frequency (IF) corresponding to the channel and to output a transport stream (TS) 122, a multimedia processor 150 including therein a TS demultiplexer (demux), a moving picture experts group (MPEG) decoder, a graphic mixer, a controller (CPU) 140 to control the overall system, and a digital audio processor 160 (hereinafter, referred to as "digital audio DSP") to receive a first digital audio signal 152 output from the multimedia processor 150 and to process the received first digital audio signal 152. Here, the multimedia processor 150 processes and outputs the TS 122 as an image through a video output or a super-video (S-video) output or as a digital video interactive (DVI) output which is a type of compressed data used to record a moving image as digital data, and separates a digital audio signal from received signals of the TS stream 122 to output the separated digital audio signal as the first digital audio signal 152.

The digital audio DSP 160 processes and outputs the first digital audio signal 152 through a SONY®/PHILIPS® digital interface (SPDIF) externally as a digital output signal 166, thereby enabling a user who utilizes an external receiver (not shown) to receive and listen to the digital output signal 166. More specifically, the SPDIF of the digital audio DSP 160 can be connected to an input terminal of the external receiver and the digital output signal 166 can be decoded at a digital audio DSP of the external receiver. Accordingly, the user can listen to sound corresponding to the digital output signal 166 through an external speaker, such as earphones. Further, the digital audio DSP 160 is constructed to decode the first digital audio signal 152 output from the multimedia processor 150, separately output the decoded signal as different types of audio data, convert the output audio data into an analog audio signal, synthesize the analog audio signal as a multi-channel audio signal 164 and output the multi-channel audio signal 164 to a national television system committee (NTSC) audio decoder 270, which will be explained in greater detail below, so that the sound can be listened to through the external speaker.

Also, an analog/digital audio selecting signal 162 is input an external source to select one of the first digital audio signal 152 and a second digital audio signal 310 input from the formatter 300. The digital audio DSP 160 outputs the selected signal as the digital output signal 166.

The analog processing part 200 comprises an NTSC IF decoder 230 and the NTSC audio decoder 270. The NTSC IF decoder 230 amplifies the IF signal corresponding to the channel received by the tuner 110 and separates the amplified IF signal into an NTSC audio signal 232 and an NTSC video signal 234. The NTSC IF decoder 230 outputs the separated NTSC video signal 234 to the multimedia processor 150 and the separated NTSC audio signal 232 to the NTSC audio decoder 270. The NTSC audio decoder 270 receives an input audio selecting signal 272, which is to select any one of the separated NTSC audio signal 232, an externally-input audio signal 220, and the multi-channel audio signal 164 output from digital audio DSP 160, amplifies the audio signal selected by the input audio selecting signal 272, and outputs the amplified signal as a left/right (L/R) output signal 276, to transmit the left/right (L/R) output signal 276 to an external speaker. In addition, the NTSC audio decoder 270 outputs the amplified signal as an NTSC audio signal 274 to the formatter 300 in order to digitally convert the selected audio signal.

The formatter 300 receives the NTSC audio signal 274 output from the NTSC audio decoder 270, processes the NTSC audio signal 274 to convert the NTSC audio signal 274 into the second digital audio signal 310 to be input into the digital audio DSP 160. Here, the NTSC audio signal 274 may be the same as the L/R output signal 276 output from the NTSC audio decoder 270.

The formatter 300 converts the input NTSC audio signal 274 into the second digital audio signal 310 using an analog/digital (A/D) converter, compresses and outputs the second digital audio signal 310 to the digital audio DSP 160, which can output the second digital audio signal 310 as the digital output signal 166 according to the analog/digital selecting signal 162. The formatter 300 may have various types of structure to receive and digitally output various analog audio signals. The formatter 300 may alternatively be disposed inside the digital audio DSP 160 instead of separately provided, as illustrated in FIG. 2. In other words, the digital audio DSP 160 can be capable of converting and outputting an input analog audio signal as a digital audio signal, and the NTSC audio signal 274 output from the NTSC audio decoder 270 can be directly input to the digital audio DSP 160 to be processed therein.

In the digital broadcasting receiving apparatus 400, as described above, even while the digital output signal 166 output from the digital audio DSP 160 externally is received through the external receiver (not shown), if the user selects the analog audio by operating the A/D audio selecting signal 162, the digital audio DSP 160 can select the second digital audio signal 310 output from the formatter 300, thereby enabling the user to digitally listen to the analog audio through the external receiver.

Herein, the second digital audio signal 310 output from the formatter 300 corresponds to the selected one of the NTSC audio signal 232 separated from the NTSC IF decoder 230, the externally-input audio signal 220, and the multi-channel audio signal 164 output from the digital audio DSP 160, according to the input audio selecting signal 272. Thus, the user can select the analog audio signal (NTSC audio signal 274) as desired, by operating the input audio selecting signal 272.

Accordingly, the formatter 300 to convert the selected analog audio signal 274 into the second digital audio signal 310 enables listening to the selected analog audio signal 274 or the second digital audio signal through the external receiver as desired by the user, without inconveniences of a conventional digital broadcasting receiving apparatus, such as having to listen to the sound only through the external receiver and change the channel to an analog channel when receiving a digital broadcasting, and having to convert to an internal speaker to connect to an external device, such as video cassette recorder (VCR).

As described above, in a digital outputting apparatus usable with an analog audio signal according to the present general inventive concept, when receiving an analog broadcasting signal through a digital broadcasting receiving apparatus or through an external device, such as VCR, a user utilizing a dedicated receiver including a digital audio DSP therein can receive and listen to sound through an external speaker.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital audio converting apparatus usable with a digital broadcasting receiving apparatus, comprising:
   an output device to separate a digital audio signal from input signals of the digital broadcasting receiving apparatus and to output the separated digital audio signal as a first digital audio signal;
   an audio decoder to separate analog audio signals from input signals of the digital broadcasting receiving apparatus and output the decoded analog audio signal;
   a formatter to process the analog audio signal output from the audio decoder and to output the processed signal as a second digital audio signal; and
   a digital audio processing device to receive the first digital audio signal from the output device, to receive the second digital audio signal from the formatter, to select one of the first digital audio signal and the second digital audio signal, and to output the selected one of the first digital audio signal and the second digital audio signal.

2. The converting apparatus of claim 1, wherein the digital audio processing device selects and outputs one of the first and the second digital audio signals according to a selecting signal input from an external source.

3. The converting apparatus of claim 1, wherein the digital audio processing device selects the second digital audio signal output from the formatter upon receiving a signal to select one of signals input from the audio decoder.

4. The converting apparatus of claim 1, wherein the first and the second digital audio signals comprise SONY/PHILIPS digital interface (SPDIF) signals.

5. The converting apparatus of claim 1, wherein the analog audio signals input to the audio decoder comprises an analog audio signal output from the digital broadcasting receiving apparatus or an analog audio signal input from an external device.

6. The converting apparatus of claim 1, wherein the audio decoder receives a plurality of analog audio signals and selects one of the plurality of analog audio signals to be processed by the formatter.

7. The converting apparatus of claim 6, wherein the plurality of analog audio signals include a multi-channel audio signal output from the digital audio processing device, an audio signal output from an analog decoder, and an externally-input audio signal output from an external source.

8. The converting apparatus of claim 1, wherein the output device outputs an image obtained from the input signals of the digital broadcasting receiving apparatus through at least one of a video output, super-video output, and a digital video interactive output.

9. A digital audio converting apparatus usable with a digital broadcasting receiving apparatus, comprising:
   an output device to separate a digital audio signal from input signals of the digital broadcasting receiving apparatus and to output the separated digital audio signal as a first digital audio signal;
   an audio decoder to separate analog audio signals from input signals of the digital broadcasting receiving apparatus and output the decoded analog audio signal; and
   a digital audio processing device to receive the first digital audio signal from the output device, to process the analog audio signals output from the audio decoder to generate a second digital audio signal, to select one of the first digital audio signal and the second digital audio signal, and to output the selected one of the first digital audio signal and the second digital audio signal.

10. The converting apparatus of claim 9, wherein the digital audio processing device selects and outputs the one of the first digital audio signal or the second digital audio signal according to a selecting signal input from an external source.

11. The converting apparatus of claim 9, wherein the digital audio processing device selects and outputs the second digital audio signal upon receiving a signal to select one of the signals input from the audio decoder.

12. The converting apparatus of claim 9, wherein the first and the second digital audio signals comprise SONY/PHILIPS digital interface (SPDIF) signals.

13. The converting apparatus of claim 9, wherein the analog audio signal input to the audio decoder comprises an analog audio signal output from the digital broadcasting receiving apparatus or an analog audio signal input from an external device.

14. A digital broadcasting receiving apparatus, comprising:
   an output device to separate a digital audio signal from signals received through a tuner of the digital broadcasting receiving apparatus and to output the separated digital audio signal as a first digital audio signal;
   an audio decoder to separate analog audio signals from signals received through the tuner of the digital broadcasting receiving apparatus and output the decoded analog audio signal;
   a formatter to process the analog audio signal output from the audio decoder and to output the processed signal as a second digital audio signal; and
   a digital audio processing device to select and receive one of the first digital audio signal from the output device and the second digital audio signal from the formatter and to output the selected one of the first digital audio signal and the second digital audio signal.

15. The digital broadcasting receiving apparatus of claim 14, wherein the digital audio processing device selects and outputs one of the first and the second digital audio signals according to a selecting signal input from an external source.

16. The digital broadcasting receiving apparatus of claim 14, wherein the digital audio processing device selects the second digital audio signal output from the formatter upon receiving a signal to select one of signals input from the audio decoder.

17. The digital broadcasting receiving apparatus of claim 14, wherein the first and the second digital audio signals comprise SONY/PHILIPS digital interface (SPDIF) signals.

18. The digital broadcasting receiving apparatus of claim 14, wherein the analog audio signals input to the audio decoder comprises an analog audio signal output from the digital broadcasting receiving apparatus or an analog audio signal input from an external device.

* * * * *